May 3, 1932. W. E. BEBBINGTON 1,856,617
PLATE VALVE
Filed July 6, 1929
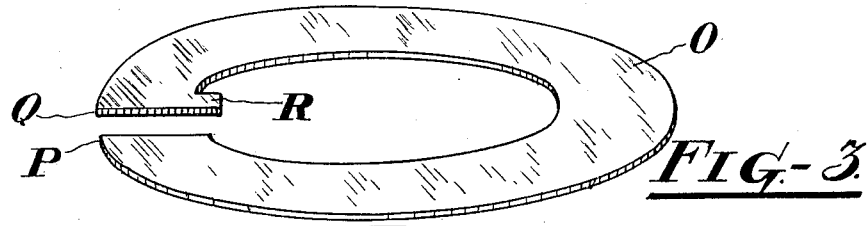
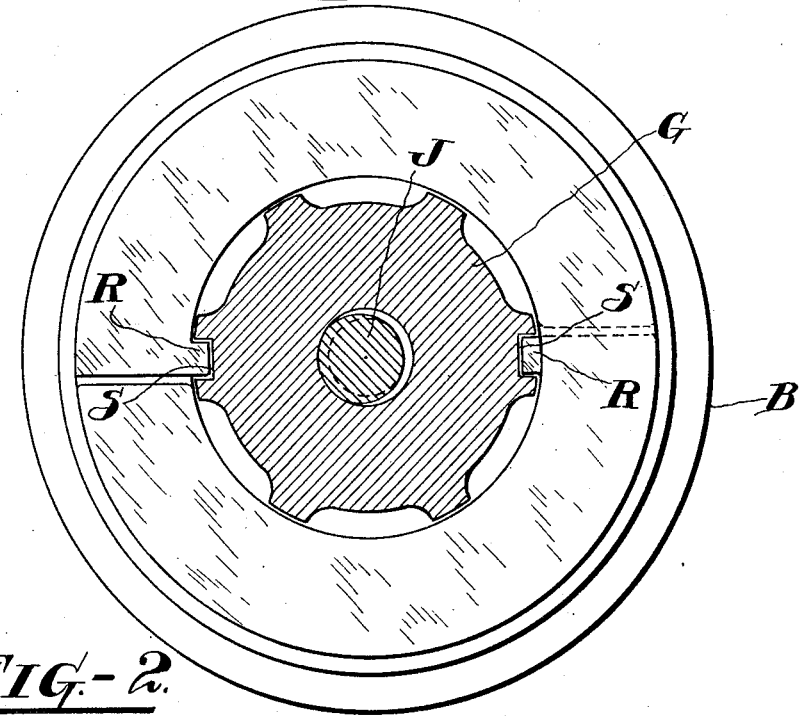
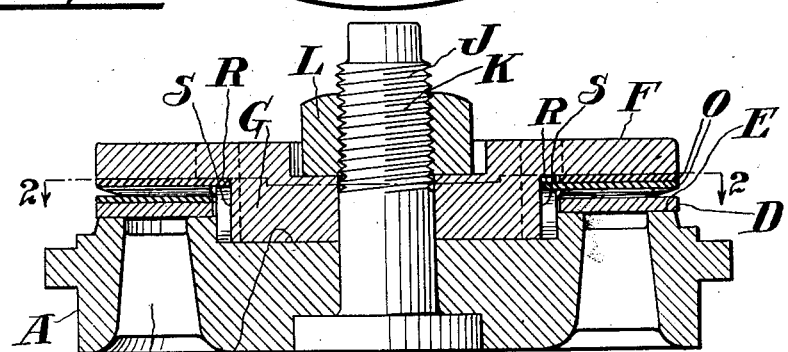
INVENTOR.
William E. Bebbington
BY
HIS ATTORNEY.

Patented May 3, 1932

1,856,617

UNITED STATES PATENT OFFICE

WILLIAM E. BEBBINGTON, OF PAINTED POST, NEW YORK, ASSIGNOR TO INGERSOLL-RAND COMPANY, OF JERSEY CITY, NEW JERSEY, A CORPORATION OF NEW JERSEY

PLATE VALVE

Application filed July 6, 1929. Serial No. 376,336.

This invention relates to valves, but more particularly to plate valves of the type used in compressors and similar machines for controlling the admission into and the exhaust of fluid from the compressor cylinder.

One object of the invention is to improve in valves of this type, particularly with respect to the valve closing means, such as the spiral springs adapted to exert a pressure on the valve plate to press it against the valve seat.

Another object is to assure a fixed position of the valve spring or springs with respect to the valve seat.

Other objects will be in part obvious and in part pointed out hereinafter.

In the drawings illustrating the invention and in which similar reference characters refer to similar parts, Figure 1 is a sectional elevation of a plate valve constructed in accordance with the practice of the invention, Figure 2 is a transverse view through Figure 1 on the line 2—2 looking in the direction indicated by the arrows, and Figure 3 is a perspective view of a valve spring.

Referring more particularly to the drawings, the valve assembly is designated generally by A and comprises a valve seat B having ports C adapted to be controlled by a valve plate D seated on an end surface E of the valve seat B.

The lift of the valve plate D is limited by a stop plate F super-imposed upon the valve seat B and in this instance having an integral extension G which extends into a recess H of the valve seat B and serves to space the stop plate F with respect to the valve seat. The stop plate F may be clamped fixedly to the valve seat B in any suitable manner as by means of a bolt J extending through the valve seat and the stop plate and having a threaded end K on which is threaded a nut L.

The valve so far described is in substantially all respects like that illustrated in United States Patent No. 1,470,625 granted to J. W. Jones for plate valve, October 16, 1923. As in the aforesaid patent a spiral spring or a pair of spiral springs O are interposed between the stop plate F and the valve plate D and encircle the extension G, the one spring O being super-imposed upon the other. Each spring consists of substantially one convolution and the ends P and Q of the springs are off-set with respect to each other so that one end of a spring O may bear against the valve plate D and the other end against the stop plate F.

In their assembled positions the springs O are so disposed that the ends P and Q of one spring are diametrically opposed to the corresponding ends of the other spring. In this way pressure will be applied to the valve plate D on the same transverse median line and the pressure against the valve plate will therefore be uniformly applied so that the entire area of the seating surface of the valve will simultaneously seat against the surface E of the valve seat B.

Heretofore, in structures employing springs of the type described, some difficulty has been experienced in maintaining the most advantageous arrangement of the springs in the assembled position. In the absence of means for assuring the correct assembled position of the springs, it has been possible to assemble them in such a manner that the pressure against the valve plate D was unevenly applied with the result that the valve plate tended to tilt both while moving away from the valve seat and also during the return movement. The present invention contemplates eliminating any chances of error in the assembling of the valve mechanism, and to this end each spring O is provided with an introverted integral lug R adjacent one end of the spring, either the end P, or the end Q as illustrated in Figure 3, and said lug R is adapted to extend loosely into a slot or groove S in the side of the extension G. In structures employing two springs O, two grooves S may be formed in the extension G and located diametrically opposite each other to accommodate a lug R of each spring.

In the drawings the present invention is illustrated for use in connection with plate valves of moderate size in which means such as the extension G are employed for holding the stop plate F and the valve seat B in spaced relation as distinguished from valves of extremely small size in which it is customary to utilize a portion of the bolt whereby the stop plate and the valve seat are clamped together for spacing these elements with respect to each other. It is to be understood that the invention is not limited in its application to the particular construction shown but that it is readily applicable to the various types and sizes of plate valves employing springs of this type.

I claim:

1. A plate valve comprising a valve seat having ports therein, a stop plate, means for holding the stop plate in spaced relation with the valve seat, a valve plate reciprocable between the valve seat and the stop plate to control the ports, a spiral spring encircling the said means and interposed between the stop plate and the valve plate to close the valve plate, and means on the first said means and on the spring adapted to loosely engage each other to hold the spring against rotation, said means on the spring being movable therewith upon longitudinal movement of said spring.

2. A plate valve comprising a valve seat having ports therein, a stop plate, means for holding the stop plate in spaced relation with the valve seat and having a slot, a circular valve plate on the valve seat to control the ports, a spiral spring encircling the said means and acting against the stop plate and the valve plate to hold the valve plate against the valve seat, and a lug on the spring extending loosely into the slot to hold the spring against rotation with respect to the stop plate.

In testimony whereof I have signed this specification.

WILLIAM E. BEBBINGTON.